July 5, 1960

R. M. BENSON 2,943,483

MASS FLOW METER

Filed Dec. 21, 1955

INVENTOR.
ROBERT M. BENSON
BY Elliott & Pastoriza
ATTORNEYS

United States Patent Office 2,943,483
Patented July 5, 1960

2,943,483
MASS FLOW METER

Robert M. Benson, Pacific Palisades, Calif., assignor to Inertial Instruments, Inc., a corporation of California Filed Dec. 21, 1955, Ser. No. 554,509

2 Claims. (Cl. 73—194)

This invention relates to devices for measuring the mass flow of fluids and more particularly to an improved mass flow meter of the impeller-turbine type for measuring the mass flow rate of liquids.

Impeller-turbine type mass flow meters measure the mass rate of fluid flow in a fluid conduit or path by angularly accelerating the fluid to a uniform velocity of motion about an axis parallel to the flow velocity direction. This angular velocity is imparted by an impeller structure driven at a constant speed of rotation. An axially aligned turbine unit is arranged to be deflected from a null position to a degree proportional to the momentum of the fluid as a consequence of intercepting the angularly moving fluid. The deflection of the turbine is restrained by resilient means and the degree of the deflection serves as an indication of the mass rate flow of the fluid. An excellent description of mass rate flow meters of this type is set forth in United States Patent No. 2,714,310 issued August 2, 1955.

The present invention has as one of its primary objects to provide an improved mass flow meter of the above described type, in which the driving means for the impeller unit including gear reduction means and a driving motor are maintained in a fluid tight housing completely sealed from any fluid flowing through the impeller unit. By providing a fluid tight housing, the driving components may be maintained in an inert gaseous environment and thereby protected from dirt and dust as well as the possibility of deterioration from corrosion.

Another equally important object of the invention is to provide an improved mass flow meter in which no regulated power supply for exciting the driving motor means is necessary whereby the entire mass flow meter is in the form of a single composite unit.

Still another object of the invention is to provide an improved impeller design whereby static fluid coupling between the impeller and turbine is minimized.

Briefly, these and other objects and advantages of the present invention are attained by providing axially aligned impeller and turbine units within a cylindrical casing adapted to be inserted in a fluid flow line. Drive means for the impeller unit are disposed within the central portion of the impeller in co-axial relationship thereto. The drive means for rotating the impeller unit includes an actuating magnetic means adapted to be rotated by an electric motor. A responsive magnetic means is associated with the impeller and magnetically coupled to the actuating magnetic means. A fluid tight housing surrounds the drive means to separate the actuating magnetic means from the responsive magnetic means so that the drive means is wholly isolated from the fluid passing through the impeller and turbine units. By employing magnetic coupling means, the housing surrounding the drive means may be continuous and integral throughout to provide an absolutely fluid tight seal.

In accordance with a further important feature of the invention, the electric motor is provided with a governor to insure that it will rotate at constant speed. This governor is wholly contained within the fluid tight housing and is coupled to the motor shaft to directly control the speed of the motor. By providing a governor within the mass flow meter, external regulated power supplies are unnecessary with the consequence that a simpler, more compact, and more convenient unit is provided. The feature of compactness and simplicity is an important consideration in aircraft applications where space availability is limited.

Still another improved feature of the present invention comprises the concept of tapering the exit portions of the impeller unit in a generally radially inward direction in such a manner that a centrifugal pumping action is established thereby decreasing static fluid coupling between the impeller and turbine units.

A better understanding of the mass flow meter of the present invention will be had by referring to the accompanying drawings, in which.

Figure 1:
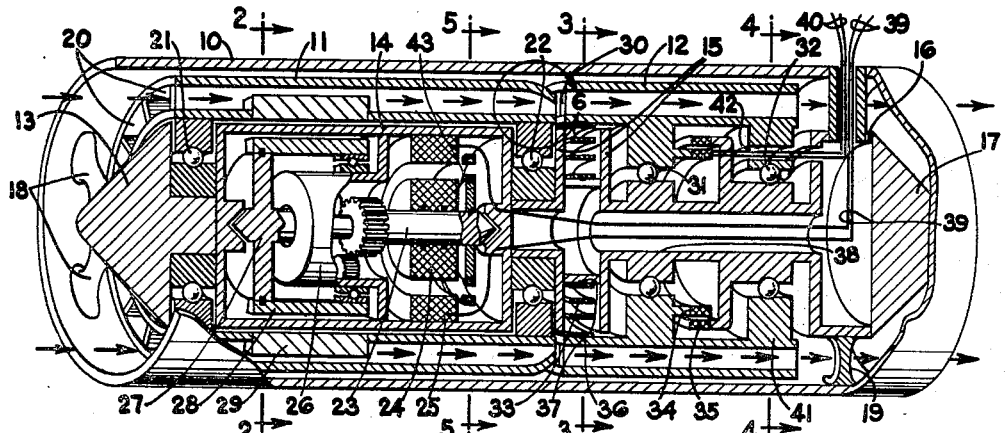
Figure 1 is a cutaway perspective view of the composite mass flow meter unit.

Referring to Figure 1 the mass flow meter is shown as comprising an outer casing 10 of cylindrical shape, surrounding an impeller unit 11 and a turbine unit 12, the impeller and turbine units being axially aligned. Generally, fluid is arranged to enter the left hand end of the casing 10, as indicated by the arrows, and pass through the impeller unit 11 wherein it receives an angular rotational velocity. The angularly moving fluid then impinges on the turbine unit 12 to impart an angular deflection thereto prior to passing from the turbine 12 and out of the right hand end of the casing 10.

The casing 10 has located therein a stationary structure assembly, radially disposed within the impeller unit 11 and turbine unit 12. This assembly includes a conically shaped nose piece 13 at the left end of the casing 10 for guiding fluid through the impeller 11, and a connected fluid tight housing 14 serving to radially separate the impeller from an inner located driving means. As shown, the stationary assembly extends towards the rear of the apparatus and further includes a pair of guide partitions 15. At the right hand end of the casing 10, the structural assembly defines an end housing wall 16 and connected tail piece 17. The nose piece 13 and tail piece 17 are secured with respect to the outer casing 10 by means of struts 18 and 19 respectively.

Figure 2:
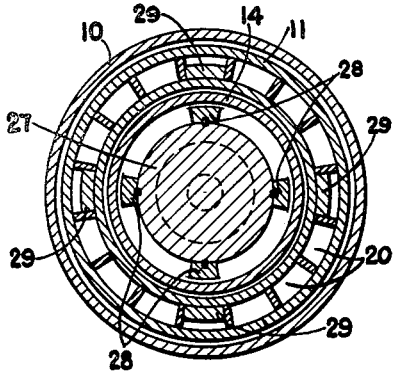
Figure 2 is a cross section taken in the direction of the arrows 2—2 of Figure 1.

As shown in Figure 1, the impeller unit includes a series of fluid passages or partition channels 20 parallel to and equally radially spaced from the axis of the impeller. The impeller itself is arranged to rotate about the fluid tight housing 14 on suitable bearings 21 and 22. Driving means for effecting rotation of the impeller is contained within the fluid tight housing 14 and includes a motor comprised of a rotor shaft 23 and wound rotor windings 24 co-axially disposed within fixed stator windings 25 secured to the inside wall of the housing 14. A gear reduction means 26 is coupled to the rotor shaft 23 to rotate a shaft 27 at a reduced speed. The shaft 27 carries actuating magnetic means in the form of a plurality of magnetic bars 28. A responsive magnetic means in the form of drag bars 29, secured to the impeller unit 11, are arranged for magnetic coupling to the magnetic bars 28, whereby rotation of the bars 28 will drag the bars 29 about to, in turn, impart rotary motion to the impeller 11. As shown more clearly in Figure 2, there are provided four actuating magnetic bars 28 within the housing 14 and four drag bars 29 on the impeller 11. The fluid tight housing 14 axially extends between and radially separates the actuating magnetic bars and the responsive magnetic bars, and thus completely seals off the driving means from the impeller unit.

The turbine unit 12 is similar in construction to the impeller in that it includes a plurality of fluid passages in the form of partitioned channels 30 and is mounted for rotation as by bearings 31 and 32. Angular deflection of the turbine 12 by rotary fluid movement is restrained by a band type spiral spring 33 axially interposed between the guide partitions 15. The degree of the angular deflection may be electrically indicated by a pair of read out coils 34 and 35 disposed between the bearings 31 and 32, the coils 34 being connected for rotation with the turbine 12 and the coils 35 being held stationary as a part of the stationary assembly.

Figure 3:
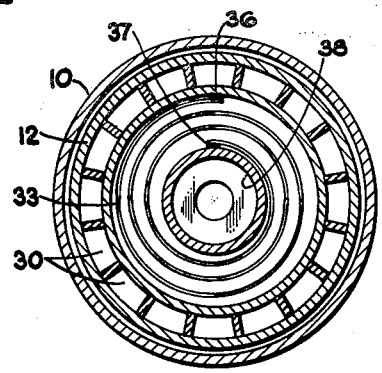
Figure 3 is another cross section taken in the direction of the arrows 3—3 of Figure 1.

As more clearly illustrated in Figure 3, the restraining spiral spring 33 is secured at its outer end 36 to the turbine 12 and at its inner end 37 to a stationary tubular structure 38 disposed within the turbine.

Figure 4:
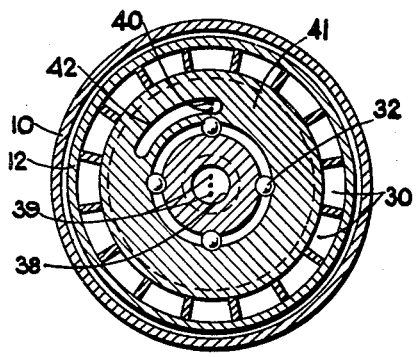
Figure 4 is another cross section taken in the direction of the arrows 4—4 of Figure 1.

Electrical energy for the motor may be brought in through conductors 39 led into the rear housing portion 16 and thence along the tubular portion structure 38 through the end sealing housing 14 to the field windings 25. The electrical read out signal from the coils 34 and 35 flows through conductors 40, which pass through an end plate 41, extending axially inwardly to serve also as a bearing support, and provided with an arcuate slot 42. Thereafter, the conductors 40 pass outwardly through the rear housing portion 16. As more clearly shown in Figure 4, the arcuate slot 42 is made of a greater arcuate extent than any contemplated deflection of the turbine 12 as a result of absorption of the angular momentum imparted to the fluid by the impeller 11.

Figure 5:
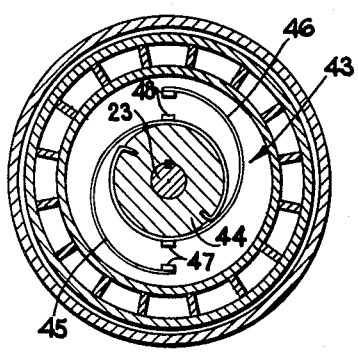
Figure 5 is yet another cross section taken in the direction of arrows 5—5 of Figure 1; and, Figure 6 is an enlarged section of that portion of the impeller unit enclosed within the circular arrow 6 of Figure 1.

In order to avoid the necessity of an auxiliary regulated power supply to insure constant speed rotation of the impeller unit, the present invention employs a governor within the unit itself. In Figure 1, this governor is indicated at 43 as secured to the rotor shaft 23 at the high speed end of the driving means prior to reduction by the gear reduction means 26. As shown more clearly in Figure 5 this governor 43 includes a circular plate 44 keyed to the rotor shaft 23 and provided with a pair of resilient arcuate springs 45 and 46 terminating in diametrically oppositely disposed pairs of contacts 47 and 48 forming a part of the wound rotor motor circuit. Normally, the springs 45 and 46 bias the contacts 47 and 48 to closed position, but when a sufficient rotational speed is achieved by the rotor shaft 23 the contacts secured to the springs 45 and 46 are thrown radially outwardly to an open position, thereby opening the wound rotor circuit and slowing the motor. When the speed of the motor diminishes, the centrifugal force acting on the contacts will decrease until the force is overcome by the biasing pressure of the arcuate springs 45 and 46 to re-close the contacts and complete the wound rotor circuit, thereby permitting the motor to speed up. This type of governor is extremely accurate and reliable particularly inasmuch as it is enclosed within fluid tight housing 14 and the possibility of dirt or dust particles affecting its delicate operation is avoided. Because of the fluid tight housing 14 which is made possible by employing magnetic coupling means for driving the impeller, a governor of the type described may be successfully employed for regulating the speed of the motor.

As mentioned previously, by thus providing governing means within the unit itself, the necessity for auxiliary regulating power supplies in conjunction with the mass flow meter is avoided, and as a result a more compact and integral component assembly is possible.

In operation, electrical power is supplied to the stator field windings 25 of the motor through the leads 39, thereby rotating the rotor 23 and through the gear train 26, in turn, rotating the magnetic bars 28. Through the magnetic coupling arrangement, rotation of the bars 28 correspondingly rotatively actuate the drag bars 29 on the impeller unit 11 about to cause the impeller unit to rotate at a given constant speed. Fluid passing into the casing 10 through the fluid passages 20 of the impeller has imparted to it an angular velocity of constant magnitude inasmuch as the speed of the impeller is carefully regulated to a constant value by the governor 43, notwithstanding lack of regulated power supply to the leads 39. This angularly directed fluid passes from the exit end of the impeller 11 directly into the fluid passages of channels 30 of the turbine 12 impinging on the side walls thereof and tending to rotate the turbine 12 in the same direction as the impeller 11. The rotation of the turbine 12 is established by the reaction force of the side walls of the fluid passages 30 in absorbing the angular momentum of the fluid. Therefore, the actual forces tending to rotate the turbine are proportional to the mass of the fluid, the angular velocity, as mentioned, always being maintained constant. The spring 33, however, exerts a restraining force on the turbine 12 limiting its angular deflection. The degree of the deflection of the turbine 12 will, therefore, indicate the mass flow rate and this rotational displacement is proportionately reflected by the relative positions of the read out coils 34 and 35 which degree of coupling results in a signal passing out the leads 40 to a suitable indicator.

An inherent error factor in mass flow meters of the impeller-turbine type results from the problem of static fluid coupling. By static fluid coupling is meant the situation that arises when, for example, no fluid may actually be flowing through the instrument, but, nevertheless, a deflection of the turbine is observed due to the rotation of the impeller. In other words, rotation of the impeller will tend to impart a rotating movement to stationary fluid adjacent the entrance portions of the turbine of a nature sufficient to exert a slight force on the turbine and provide a read out in spite of the fact that there a no flow condition exists as between the impeller and turbine units.

Figure 6:
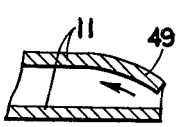

In accordance with a feature of the present invention, the impeller is designed to minimize such static fluid coupling. This design feature comprises tapering the exit end wall portions of the impeller radially inwardly as shown in detail at 49 in the enlarged view of Figure 6. This tapering of the terminal wall portions of the exit end of the impeller has the effect of tending to direct static fluid back down the passages of the impeller rather than out the exit end towards the turbine. Thus, the impeller throws fluid against the tapered end wall portion 49, thereby tending to pump it by centrifugal action back towards the entrance ends of the passages 20. The net effect is to minimize the tendency for motion of the fluid to be transmitted to the turbine, whereby the only time that such motion will be transmitted to the turbine is when fluid is flowing through the device. Therefore, by designing the exit end of the impeller as described, static fluid coupling between the impeller and turbine is minimized and the accuracy of the instrument increased accordingly.

It will thus be apparent from the foregoing description that the present invention provides a greatly improved mass flow meter in which no external power supply is needed inasmuch as it is possible to enclose an accurate governing means, motor drive means, and gear reduction means wholly within a fluid tight housing and in an inert atmosphere. Various changes and modifications that fall within the scope and spirit of the invention will occur to those skilled in the art. The mass flow meter is, there-

What is claimed is:

1. A mass flow meter comprising, in combination: an impeller unit having a hollow hub portion; a turbine unit in axial alignment with said impeller unit, said impeller and turbine units being mounted for independent turning about their common axis and including enclosed longitudinal passages having inlet and outlet ends for passing fluid; a motor disposed within said hollow hub portion; a plurality of actuating magnets within said hollow hub portion positioned for rotation adjacent to the inside annular wall of said hub portion; speed reduction gears connected between said motor and said actuating magnets so that said magnets are rotated at a reduced speed upon energization of said motor; a speed controlling governor within said hollow hub portion connected to said motor for rotation therewith, said speed controlling governor including means electrically connected to said motor and responsive to a change in centrifugal force resulting from a change in speed of said motor from a predetermined constant speed, for maintaining said motor at said constant speed; a plurality of magnetic responsive bars, equal in number to said plurality of magnets, secured to the outside annular wall of said hub portion, said bars being respectively magnetically coupled to said actuating magnets to rotate said impeller when said actuating magnets are rotated; a fluid tight housing within said hollow hub portion, said housing surrounding said motor, speed controlling governor, actuating magnets, and speed reduction gears, to isolate the same from fluid passing through said passages of said impeller and turbine units, rotation of said impeller unit imparting an angular momentum to fluid passing from said impeller unit to said turbine unit to apply a turning torque to said turbine unit; and resilient means connected to said turbine unit opposing said torque whereby the degree of rotational displacement of said turbine unit provides an indication of the rate of mass flow of said fluid.

2. The subject matter of claim 1, in which the radially outermost wall adjacent to said outlet ends of each of said enclosed longitudinal passages in said impeller unit is tapered inwardly whereby static fluid coupling between said impeller and turbine units is reduced.

References Cited in the file of this patent

UNITED STATES PATENTS

| 1,630,394 | Lee | May 31, 1927 |
| 2,386,505 | Puchy | Oct. 9, 1945 |
| 2,713,261 | Butterworth et al. | July 19, 1955 |
| 2,714,310 | Jennings | Aug. 2, 1955 |
| 2,857,761 | Bodge | Oct. 28, 1958 |

FOREIGN PATENTS

| 179,295 | Great Britain | May 2, 1922 |
| 717,897 | Great Britain | Nov. 3, 1954 |